United States Patent

Olah et al.

[15] 3,649,774
[45] Mar. 14, 1972

[54] TRANSDUCER MOUNTING ASSEMBLY

[72] Inventors: Louis Olah, Cupertino; Gregory J. Maleski, Sunnyvale, both of Calif.

[73] Assignee: Newell Industries, Inc., Sunnyvale, Calif.

[22] Filed: July 10, 1969

[21] Appl. No.: 840,642

[52] U.S. Cl............179/100.2CA, 340/174.1 F, 346/74 MC
[51] Int. Cl..................................G11b 5/56, G11b 21/10
[58] Field of Search....................179/100.2 C, 100.2 CA; 340/174.1 F; 346/74 MC

[56] References Cited

UNITED STATES PATENTS

| | | | |
|---|---|---|---|
| 2,530,584 | 11/1950 | Pontius | 179/100.2 CA |
| 2,644,856 | 7/1953 | Pettus | 179/100.2 CA |
| 2,827,355 | 3/1958 | Lubkin et al | 346/74 MC |
| 2,862,067 | 11/1958 | Christoff | 340/174.1 F |

*Primary Examiner*—Stanley M. Urynowicz, Jr.
*Assistant Examiner*—Alfred H. Eddleman
*Attorney*—Flehr, Hohbach, Test, Albritton & Herbert

[57] ABSTRACT

A transducer mounting assembly having a plurality of magnetic transducers each with its own gap. Each gap is independently adjustable laterally relative to the gaps of the other transducers and further adjustable to position all gaps transversely of the record path and in a single straight line extending through all gaps.

7 Claims, 7 Drawing Figures

INVENTORS
LOUIS OLAH
GREGORY J. MALESKI

BY
Flehr, Hohbach, Test,
Albritton & Herbert
ATTORNEYS

TRANSDUCER MOUNTING ASSEMBLY

BACKGROUND OF THE INVENTION

This invention pertains to a magnetic transducer mounting assembly for properly disposing the recording gap of a magnetic recording transducer relative to a moving record medium, and is particularly useful in providing positional adjustment of the several gaps in multiple gap transducer assemblies, as where they are located in side-by-side relation.

Heretofore, for example, in a number of magnetic recording machines, transducers have been disposed in side-by-side relationship for cooperation with respective recording channels or paths extending along the direction of movement of the recording medium.

In certain machines, the record medium, such as magnetic recording tape, may be fed in either of two opposite directions and the transducers are arranged to cooperate with different paths during the playing of the tape in one direction from those paths with which the transducers were disposed to cooperate while moving the tape in its original direction. Under these circumstances, problems of misaligned recording gaps, previously capable of being tolerated, may become sufficiently severe as to constitute a limitation upon the usefulness of the equipment.

For example, where a number of transducer gaps are arranged in side-by-side relation, it is desirable and usually intended that all of the gaps of the multiple transducer assembly lie in a common line extending normal to the direction of travel of the magnetic medium. However, considering the extremely small dimensions involved in most machines, such alignment is quite difficult to achieve in manufacturing multiple gap transducer elements, particularly where each magnetic recording transducer forms a separate structure independently removable from the assembly for purposes of replacement for example.

Thus, a problem referred to as "gap scatter" arises where the gap of one or more of the side-by-side transducers does not lie in a direct line with the others. While this problem is not particularly serious for extremely minor variations of positioning of the gap, the problem becomes regenerative and is enhanced to a considerable degree where bidirectional movement of the recording medium is employed together with lateral shifting of the head assembly between reversals of the medium.

In addition to the above, it is typically highly desirable to insure uniform spacing between the record paths. Where multiple transducers are manufactured and assembled individually into an assembly (for purposes of allowing any individual transducer to be replaced upon detection of its defective operation or function) it has been observed that precise uniform interchannel spacing has not been readily achievable.

In addition to the above, where a plurality of recording transducers are disposed in a common support assembly, the gaps of each of the transducers should be arranged to confront the record medium from a common plane. This requirement also has presented problems in the past.

Yet another problem which has existed in the construction of multiple transducer mounting assemblies is to be found in the problem of insuring that all of the transducer gaps are oriented at right angles to the direction of movement of the recording medium. This correction is referred to herein as a correction in the azimuth of the transducer. Thus, it will be apparent that where one or more of the transducer gaps is twisted slightly relative to its proper orientation perpendicular to the path of movement of the medium, problems are immediately created which are well known to those skilled in the art.

SUMMARY OF THE INVENTION AND OBJECTS

In general, it is an object of the present invention to provide an improved transducer mounting assembly.

It is another object of the invention to provide an improved transducer mounting assembly which readily and simply provides a solution to the above problems and technical shortcomings heretofore experienced.

It is yet a further object of the invention to provide an improved transducer mounting assembly wherein a number of magnetic recording or playback transducers may be supported in readily removable relationship with respect to each other and yet provide correction for each of the above conditions.

In general, there has been provided a transducer assembly of a type for supporting a plurality of magnetic transducers for transducing record paths along a moving record medium wherein each transducer includes a recording or playback gap extending transversely of the path, usually perpendicular to the path. A plurality of individual mounting assemblies are joined together each including its own frame element for supporting an associated one of the transducers. Means are provided with respect to each transducer for independently adjusting the position of the gap thereof laterally relative to the gaps of the other transducers. Means are further provided for each transducer for independently adjusting the position of each gap to move the gap relative to its own frame so as to locate all gaps in a single straight line extending transversely of the record path. All of the individual transducer assemblies are held together to form a multiple gap assembly whereby the above advantageous adjustments can be readily made at minimal cost.

DETAILED DESCRIPTION OF A PREFERRED EMBODIMENT

Figure 1:
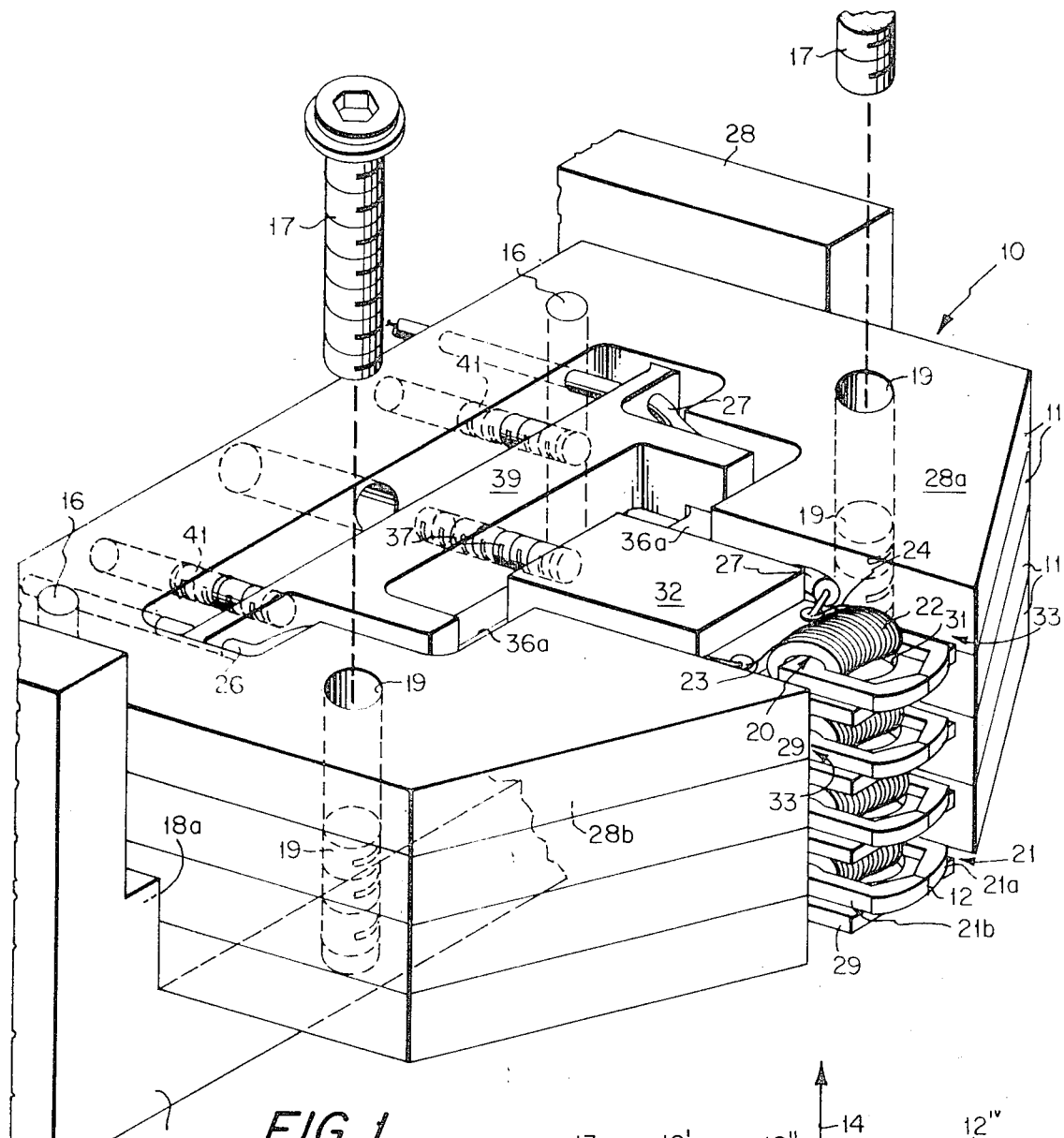
FIG. 1 is an isometric view partially broken away showing a multiple head transducer assembly, according to the invention.

The multiple gap transducer assembly 10 shown in FIG. 1, and its individual component transducer mounting assemblies 11, are capable of accommodating adjustments to position their respective magnetic recording gaps 12 whereby (a) the lateral spacing between gaps can be uniformly established, (b) the gaps can all be placed upon a common straight line axis 13 (FIG. 2) oriented perpendicular to the direction 14 of a magnetic recording path, and (c) each gap 12 can further be independently rotated to place it in precise parallelism with the straight line axis 13 so as to make any needed azimuth corrections, as now to be described.

As shown in FIG. 1, the multiple gap transducer assembly 10 includes a plurality of four individual component mounting assemblies 11 which are identical in construction, one of which will be described in detail further below.

The stack of four individual component mounting assemblies 11 lie in coplanar relation to form a group held together by dowel pins 16. The consolidated group of units 11 is then fastened by suitable means, such as the screws 17 threaded into holes 19 formed in a flat face of any suitable mounting stirrup or bracket 18. As shown herein, bracket 18 includes a registration face portion 18a against which assembly 10 can be properly registered as to provide easy alignment of the attachment openings 21 through which screws 17 are disposed.

Figure 2:
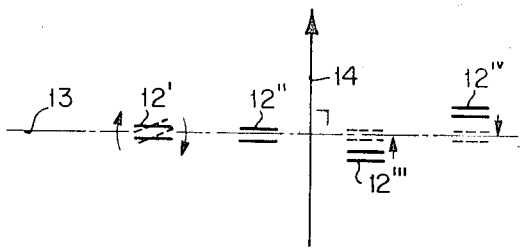
FIG. 2 shows a diagram for use in describing a problem known as "gap scatter;"
Figure 3:
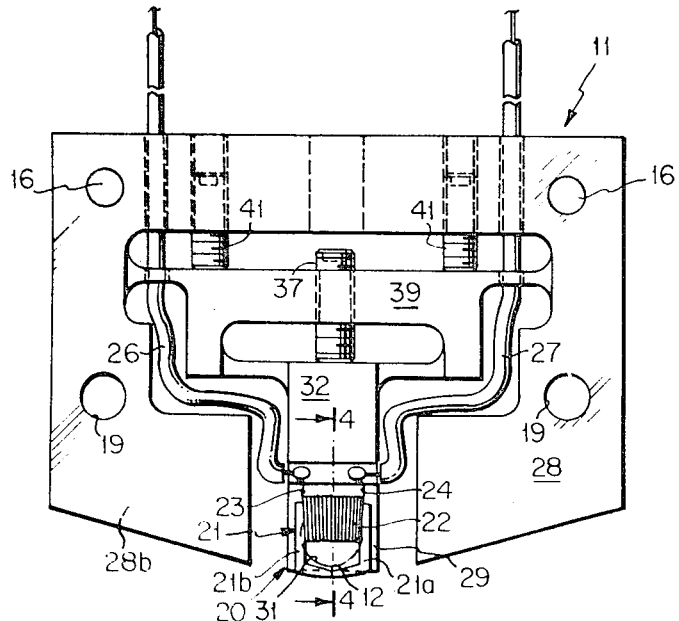
FIG. 3 is a side elevation view showing a transducer assembly, according to the invention.
Figure 4:
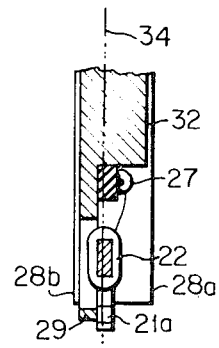
FIG. 4 shows an enlarged detail section view taken along the line 4—4 of FIG. 3.
Figure 7:
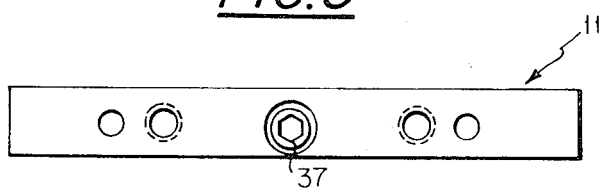
FIG. 7 is a plan view of FIG. 5.
Figure 5:
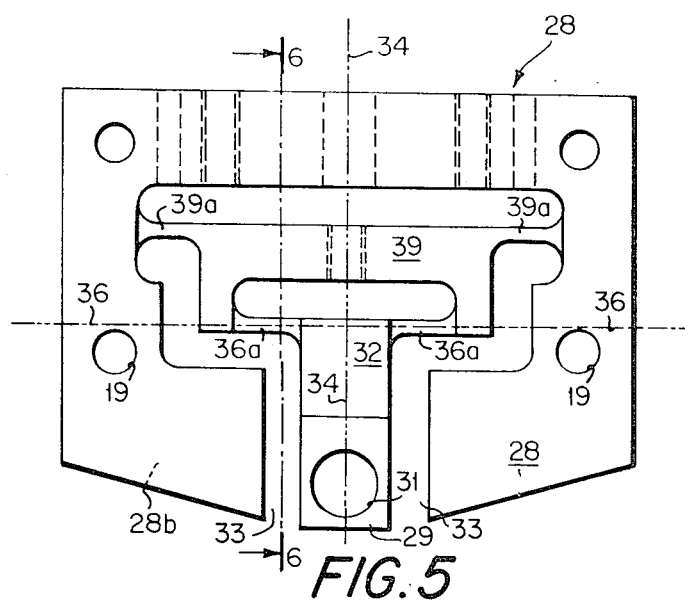
FIG. 5 is a side elevation view of a unitary component of the assembly as shown in FIG. 3.

Referring now to FIG. 3 and to the mounting element shown in FIG. 5, the function and operation of the individual component mounting assemblies 11 can be more readily understood. FIG. 2 diagrams certain of the correctional adjustments in the gap positioning for reference hereinafter.

Thus, assembly 11 carries a magnetic recording or playback transducer for cooperating with (transducing) a moving magnetic record medium so as to record or play back signals along a record path extending in the direction opposite to the direction of movement of the medium relative to the transducing gap 12.

As will be readily understood by those skilled in this technology, magnetic transducer assemblies 20 of a type for recording or playing back signals with respect to a moving magnetic recording medium commonly employ a ring-type magnetic core element 21 which forms a magnetic flux circuit from one pole piece portion 21a to the other, 21b. A coil 22 of wire, as schematically shown in FIG. 3 encircles a portion of the magnetic core element 21 whereby upon properly energizing the coil 22, a sufficient magnetic flux can be generated at gap 12 so as to record this electrical event on that portion of the magnetic record medium then passing beneath gap 12. During playback, recorded signals appearing at gap 12 serve to complete the magnetic flux circuit through core element 21 whereby a coil, such as coil 22 can serve to sense the presence of these prerecorded signals and feed the output of the coil to suitable circuitry for utilization.

As shown in FIG. 3, leads 23, 24 are shown coupled to output cables 26, 27 for transmitting or receiving the signals referred to above.

Each assembly 11 includes a frame unit 28 of a rigid material, such as brass, formed in a planar configuration whereby its opposite side faces 28a, 28b lie in parallel, spaced planes so that a stack of such units 11 can be registered in side-by-side relation as explained above (FIG. 1).

As shown in FIG. 5, each frame 28 is formed as an integral structure wherein the material remains temperature stable and is ductile and permanently deformable when subjected to stress so as ideally not to have any memory characteristic or resilience. A suitable material for these components may, for example, be brass.

Each frame unit 28 includes means for carrying a magnetic transducer assembly 20 at the distal end of a downwardly depending tab 29 formed with an opening 31 adapted to accommodate the coil portion of transducer assembly 20. Immediately above tab 29, a wrench block 32 has been formed whereby a suitable wrench or other engaging tool can be inserted into the access passages 33 to engage and twist block 32 (and tab 29) about axis 34. In this manner, a gap 12 can be twisted into a transversely extending perpendicular orientation relative to path direction 14 in the plane of the recording surface.

Thus, means are provided for supporting transducer assembly 20 and tab 29 from a mounting axis 36 disposed to extend in the direction of the record path 14. The relatively thin bridge portions 36a are sufficiently small whereby upon engaging and twisting block 32, slight permanently deformed changes in the bridge portions 36a can be effected.

Figure 6:
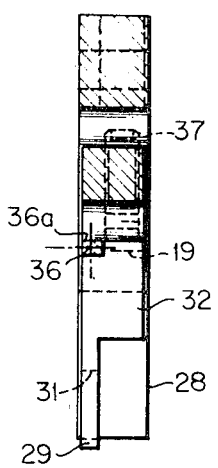
FIG. 6 shows a section view of FIG. 5 taken along the line 6—6 thereof.

Means are provided herein for adjusting the lateral position of each gap 12 to provide uniform spacing between recording paths, as now to be described. Thus, as shown in FIG. 6, block 32 is offset laterally to one side of the mounting axis 36 whereby a screw 37, such as an Allen screw, can be threaded into contact against the upper contact surface of the block to rotate block 32 (and tab 29 with transducer 20) about axis 36. Accordingly, such rotation of the downwardly depending tab 29 carries transducer 20 laterally to one side so as to diminish the spacing between adjacent transducer gaps 12. Portions of unit 28, such as block 32, tab 29 and portions yet to be described, clear of and between planes of the opposite faces 28a, 28b of unit 28 whereby the adjusting movements described herein may be accommodated.

Means are provided for moving the position of gap 12 relative to frame 28 in a direction along path 14 so that all gaps 12 can be brought into a common transversely extending axis 13 (FIG. 2). In this manner, the problem of gap scatter (shown by gaps 12', 12'', 12''', 12'ᵛ in FIG. 2) can be corrected.

Thus, there is provided means supporting transducer 20 and forming an elongated support arm 39. Support arm 39 is movable about an axis transversely thereto by threading screws 41 downwardly through the upper transverse portion of frame unit 28 into contact against the upper surface of support arm 39. Support arm 39 is carried within the periphery of frame unit 28 by the relatively thin and weakened bridge portions 39a which are perforated for passing electrical cable 26, 27 therethrough from transducer 20.

Accordingly, if it is desired to shift gap 12 to the left as shown in FIGS. 3 or 5, the right-hand screw 41 is screwed further downwardly so as to bend the right-hand end of support arm 39 very slightly about the left-hand weakened bridge portion 39a. In order to move gap 12 to the right as shown in FIG. 3, the reverse procedure is, of course, pursued.

In order to advance any given gap 12 outwardly toward the record medium, both screws 41 are advanced together, i.e., an equal amount, and in this manner all gaps 12 can be disposed to lie in a common plane for presentation to the surface of the record medium.

Briefly, it will be readily evident that a structure of the type described above can be readily adjusted so as to orient and dispose the gaps 12 as desired to correct for any imperfections, however slight, in their disposition.

Thus, if it is necessary to move gap 12 one direction or the other in the direction of the recording path so as to bring the gap into a common transverse axis 13, one or the other of the two screws 41 can be employed to act upon support arm 39 and bend it downwardly from one end or the other. This action serves to move the cantilevered structure comprised of tab 29 and transducer 20 to position the gap 12.

Where it is desired to correct for lack of uniformity between adjacent gaps 12, the gaps can be moved from one side to the other by means of operation of screw 37 acting downwardly against the top of block 32 so as to rotate tab 29 to one side.

In the event that gap 12 of any given unit 11 is oriented with an incorrect azimuth characteristic, it becomes a simple matter to engage the "wrench flats" formed by the flat sides of the wrench block 32 and twist this structure slightly to deform the relatively thin bridges 36a constituting part of the axis 36.

We claim:

1. In a transducer assembly of a type for supporting a magnetic transducer to cooperate with a record medium moving in a predetermined direction to record or play back signals along a record path extending along said medium in said direction, and wherein said transducer includes a recording or playback gap defined between transducer pole piece portions, the gap extending transversely of the record path, a mounting assembly comprising a frame, a bridge portion defining a mounting axis extending in a direction generally parallel to said record path, a support arm carrying said transducer and extending from said bridge portion in a direction normal to said axis, said support arm being movable about an axis normal to said mounting axis for adjusting the angle of said gap relative to said path, threaded means carried by said bridge portion and engaging said support arm for rotating said arm about said mounting axis to move said gap laterally of said path, and threaded means carried by said frame and engaging said bridge portion for moving said bridge portion and said mounting axis relative to said frame.

2. A transducer assembly according to claim 1 wherein said frame, bridge portion, and support arm are formed as a unitary structure from ductile, permanently deformable material.

3. A transducer assembly according to claim 1 wherein the threaded means carried by said frame includes a pair of adjusting screws engaging said bridge portion on opposite sides of said support arms.

4. In a transducer assembly of a type for supporting a plurality of magnetic transducers to cooperate with a record medium moving in a predetermined direction to transduce signals along a record path extending along said medium in said direction, and wherein said transducers each include a recording or playback gap defined between transducer pole piece portions, the gaps extending transversely of the record path, a plurality of mounting assemblies each comprising a planar, rigid frame for carrying one of said transducers, a bridge portion defining a mounting axis extending in a 5. In a transducer assembly of a type for supporting a plurality of magnetic transducers for transducing record paths along a moving record medium and wherein each transducer includes a recording or playback gap extending transversely of the path, a mounting assembly comprising a plurality of planar frame elements for respectively supporting said transducers, each of said frame elements including a generally U-shaped outer portion defining a generally rectangular opening, a support member disposed in said opening, and extending in a direction generally parallel to said paths, ductile ear portions connecting the ends of said member to the sides of said outer portion, a support arm carrying one of the transducers and extending from said support member in a direction normal thereto, and a pair of ductile ear portions connecting said support arm to said support member, and means for holding all of said frame elements together.

6. A transducer assembly according to claim 5 wherein each of said frame elements further includes an adjusting screw carried by said support member and engaging said support arm for rotating said arm about an axis generally parallel to said paths.

7. A transducer assembly according to claim 5 wherein each of said frame elements further includes a pair of adjusting screws carried by the outer portion of said elements and engaging said support member proximate to the ends thereof.

* * * * *